United States Patent [19]

Perron et al.

[11] Patent Number: 5,019,625

[45] Date of Patent: May 28, 1991

[54] COMPATIBILIZING AGENT FOR POLYCARBONATE AND POLYAMIDE POLYMER BLENDS

[75] Inventors: Peter J. Perron; Edward A. Bourbonais, both of Arlington, Tex.

[73] Assignee: Dexter Corporation, Windsor Lock, Conn.

[21] Appl. No.: 254,542

[22] Filed: Oct. 6, 1988

Related U.S. Application Data

[60] Division of Ser. No. 95,497, Sep. 10, 1987, Pat. No. 4,782,114, which is a continuation-in-part of Ser. No. 915,239, Oct. 3, 1986, abandoned.

[51] Int. Cl.$^5$ .................. C08L 77/12; C08L 69/00; C08L 75/04; C08L 23/10
[52] U.S. Cl. ........................ 525/66; 525/71; 525/92; 525/127
[58] Field of Search ............... 525/66, 68, 127, 166, 525/71, 92

[56] References Cited

U.S. PATENT DOCUMENTS

| | | | |
|---|---|---|---|
| 3,250,823 | 5/1966 | Zeitlin | 525/66 X |
| 3,431,224 | 3/1969 | Goldblum | 525/433 X |
| 3,801,673 | 4/1974 | O'Connell | 525/931 X |
| 4,041,103 | 8/1977 | Davison et al. | 260/857 D |
| 4,085,163 | 4/1978 | Gergen et al. | 260/857 D |
| 4,088,627 | 5/1978 | Gergen et al. | 260/42.18 |
| 4,107,131 | 8/1978 | Gergen et al. | 525/96 X |
| 4,129,715 | 12/1978 | Chen et al. | 528/67 |
| 4,174,358 | 11/1979 | Epstein | 525/183 |
| 4,251,642 | 2/1981 | Tan | 525/66 |
| 4,254,232 | 3/1981 | Mueller | 525/66 |
| 4,283,502 | 8/1981 | Richardson | 525/66 |
| 4,304,381 | 12/1981 | Aoki et al. | 525/66 |
| 4,307,207 | 12/1981 | Wiggins et al. | 525/66 |
| 4,317,891 | 3/1982 | Sakano et al. | 525/66 |
| 4,328,331 | 5/1982 | Chen et al. | 528/288 |
| 4,338,413 | 7/1982 | Coran et al. | 525/179 |
| 4,339,555 | 7/1982 | Ohmura et al. | 525/66 |
| 4,381,371 | 4/1983 | Nielinger et al. | 525/66 |
| 4,387,184 | 6/1983 | Coquard et al. | 525/183 |
| 4,393,168 | 7/1983 | Giles | 525/66 |
| 4,423,185 | 12/1983 | Matsumoto | 525/66 |
| 4,448,937 | 5/1984 | Bopp | 525/432 |
| 4,478,978 | 10/1984 | Roura | 525/66 |
| 4,525,531 | 6/1985 | Zukosky et al. | 525/92 |
| 4,537,929 | 8/1985 | Nagrani | 524/504 |
| 4,584,344 | 4/1986 | Baer | 525/66 |
| 4,587,297 | 5/1986 | Walker et al. | 525/64 |
| 4,594,386 | 6/1986 | Olivier | 525/66 |
| 4,634,737 | 1/1987 | Liu et al. | 525/146 |
| 4,656,228 | 4/1987 | Richter et al. | 525/433 |
| 4,716,198 | 12/1987 | Murabayashi | 525/66 |
| 4,782,114 | 11/1988 | Perron | 525/66 |
| 4,788,249 | 11/1988 | Maresca | 525/66 |

FOREIGN PATENT DOCUMENTS

| | | |
|---|---|---|
| 886134 | 5/1981 | Belgium . |
| 125739 | 11/1984 | European Pat. Off. ............ 525/66 |
| 131188 | 1/1985 | European Pat. Off. . |
| 148743 | 7/1985 | European Pat. Off. . |
| 149091 | 7/1985 | European Pat. Off. . |
| 183116 | 6/1986 | European Pat. Off. . |
| 188683 | 7/1986 | European Pat. Off. . |
| 227053 | 1/1987 | European Pat. Off. . |
| 3444096 | 6/1985 | Fed. Rep. of Germany . |
| 3605573 | 8/1987 | Fed. Rep. of Germany . |
| 50-085651 | 7/1975 | Japan . |
| 58-8760 | 1/1983 | Japan . |
| 58-71952 | 4/1983 | Japan . |
| 058447 | 4/1985 | Japan . |
| 62-064864 | 3/1987 | Japan . |
| 62-275156 | 11/1987 | Japan . |
| WO84/03894 | 11/1984 | PCT Int'l Appl. . |
| WO84/04752 | 12/1984 | PCT Int'l Appl. . |
| 1037776 | 8/1966 | United Kingdom . |
| 1363402 | 8/1974 | United Kingdom . |

OTHER PUBLICATIONS

Estamid 90A, Upjohn Elastomers, 5 pages.
Compatibilizers: Blending More Perfect Unions, Plastics Compounding, Sep./Oct. 1986, pp. 20-23.

*Primary Examiner*—John C. Bleutge
*Assistant Examiner*—David Buttner
*Attorney, Agent, or Firm*—Pennie & Edmonds

[57] ABSTRACT

A compatibilizing agent for polymeric blends of polycarbonates and polyamides which have improved physical and chemical resistance properties, without any substantial sacrifice of the desirable properties of the polycarbonate or polyamide. The polymeric compatibilizing agent has at least one functional group soluble in the polycarbonate and at least one functional group soluble in the polyamide, and preferably is a polymeric compatibilizing agent for blends of polycarbonate and polyamide resins, which comprises from about 10 to 90 or even 100 weight percent of a compound selected from the group consisting of a polyetherimide, a polyurethane and a linear segmented thermoplastic elastomers having an ester segment and a hard segment of semi-crystalline, partially aromatic polyamide, based on diphenylmethane diisocyanate; from about 90 to about 10 weight percent of a maleic anhydride grafted polymeric blend; from 0 to about 80 weight percent of an alloying agent; said compatibilizing agent thus having at least one functional group soluble in the polycarbonate resin and at least one functional group soluble in the polyamide resin; wherein the melting or softening point of said compatibilizing agent is no greater than the melting or softening points of the polycarbonate and polyamide resin constituents in the blend. A process for producing the polymeric blends of a polycarbonate and a polyamide is also provided.

23 Claims, No Drawings

COMPATIBILIZING AGENT FOR POLYCARBONATE AND POLYAMIDE POLYMER BLENDS

CROSS REFERENCE TO RELATED APPLICATIONS

This application is a division of application Ser. No. 095,497, filed Sept. 10, 1987, now U.S. Pat. No. 4,782,114, which is a continuation-in-part of application Ser. No. 915,239, filed Oct. 3, 1986, abandoned.

TECHNICAL FIELD

The present invention relates generally to a compatibilizing agent for polymeric blends of polycarbonates and polyamides wherein the melt compounded blend has improved physical and chemical properties, and to a process for preparing such blends.

BACKGROUND ART

Polymeric resins have long been known for their chemical and physical properties. Molded or extruded resins have found numerous applications, such as in appliances, consumer products, electronics, machine components, automotive parts and the like. However, the physical and chemical properties of the polymeric resins, and thus the components or articles fabricated therefrom, vary widely depending upon the chemical structure of the main chain or backbone of the polymeric resins, as well as the molecular weight of such polymeric resins.

For example, polycarbonate resins are known to possess desired heat distortion temperatures, but suffer in that such polymeric resins, and thus articles molded or extruded therefrom, generally possess low chemical resistance to solvents, low stress crack resistance, and low impact strength when thick sections of the polymer are required or utilized. On the other hand, polymeric resins, such as the polyamides (i.e. the nylons), are known to be chemically resistant to a large number of solvents, and to have a desired degree of toughness and abrasion resistance. However, the polyamide polymers also possess certain inherent disadvantages, unless modified, such as relatively low impact strength, a low heat distortion temperature, and an affinity to pick up moisture.

In order to modify the properties of polymeric resins, mixtures of selected polymeric resins have been utilized to form blends. However, in many cases, such as with polycarbonate and polyamide resins, such resins are incompatible. Attempts to render such resinous materials compatible have generally involved expensive chemical compounds or process conditions, and even then the resulting resinous blend often does not possess the desired properties. Therefore, it would be highly desirably and a significant advance in the art if an efficient and economical process or compatibilizing agent could be found which could render polycarbonate resins compatible with polyamide or nylon resins, without sacrificing the desired properties of each of the resinous materials forming the blend.

SUMMARY OF THE INVENTION

An object of the present invention is to provide a compatibilizing agent for polycarbonate and polyamide resins which thus enables an improved polymeric blend of these materials to be obtained without a substantial sacrifice of the desirable properties of each of the resins employed in the blend.

Another object of the present invention, while achieving the before stated object, is to provide an inexpensive process for producing such polymer blends of polycarbonates and polyamides by the use of conventional mixing equipment.

Other objects, advantages and features of the present invention will become clear from the following detailed description when read in conjunction with the appended claims.

Accordingly, the present invention relates to a compatibilizing agent for polymeric blends of polycarbonates and polyamides which agent allows the blend to achieve improved physical and chemical resistance properties, without any substantial sacrifice of the desirable properties of the polycarbonate or polyamide. These polymeric blends possess the desired properties of each of the constituents forming the blend, namely, the blend has improved resistance to solvents and stress crack agents, a relatively high impact strength and heat distortion temperature, and the polymeric blends do not have an affinity to absorb moisture.

The polymeric blend of a polycarbonate and a polyamide, such as nylons, having the before-mentioned properties generally comprises from about 20 to about 90 weight percent of a polycarbonate having a molecular weight of from about 20,000 to about 40,000, from about 70 to about 5 weight percent of a linear polyamide having a molecular weight of at least about 2,000, and from about 20 to about 2 weight percent of a polymeric compatibilizing agent having at least one functional group soluble in the polycarbonate and at least one functional group soluble in the polyamide.

The polymeric compatibilizing agent for such blends of polycarbonate and polyamide resins generally comprises from about 10 to 90 weight percent of a compound selected from the group consisting of a polyetherimide, a polyurethane and linear segmented thermoplastic elastomer having an ester segment and a hard segment of semi-crystalline, partially aromatic polyamide, based on diphenylmethane diisocyanate; from about 9 to about 10 weight percent of a maleic anhydride grafted polymeric blend; and from about 0 to about 80 weight percent of an alloying agent. Preferably, the melting or softening point of the compatibilizing agent is no greater than the melting or softening points of the polycarbonate and polyamide resin constituents of the blend.

The present invention also provides a process for producing a polymeric blend of a polycarbonate and a polyamide which comprises: (a) mixing from about 20 to about 90 weight percent of a polycarbonate having a molecular weight of from about 20,000 to about 40,000 with from about 70 to about 5 weight percent of a linear polyamide having a molecular weight of at least about 2,000, and from about 20 to about 2 weight percent of a polymeric compatibilizing agent having at least one functional group soluble in the polycarbonate and at least one functional group soluble in the polyamide for an effective period of time to produce a substantially homogeneous mixture; and (b) introducing the homogeneous mixture into a compounding extruder to produce a polycarbonate-polyamide melt compounded blend having the desirable properties of each of the constituents forming the blend. The compounding extruder is operated at a temperature above the melting temperature of the constituents of the polymeric blend, and at extensive shear so as to provide for improved mixing of the components of the blend and substantially uniform dispersement of the constituents throughout the blend.

DETAILED DESCRIPTION OF THE PREFERRED EMBODIMENTS

The term "blend" as used herein is to be understood to signify a substantially homogeneous mass of materials, and the resulting extrudate, preferably in pellet form, which is obtained by heating such materials to the melting or softening point under high shear conditions in an extruder.

The blends of the present invention, which unexpectedly possess the desired chemically and physically properties of each of the constituents, generally comprise from about 20 to about 90 weight percent of a polycarbonate, from about 70 to about 5 weight percent of a linear polyamide, and from about 20 to about 2 weight percent of a polymeric compatibilizing agent having at least one functional group soluble in the polycarbonate and at least one functional group soluble in the polyamide. Such compatibility agents are generally block copolymers and blends containing such block copolymers wherein the block copolymer functions as an interfacial element between the two incompatible components.

The polycarbonates which can be employed in the formulation of the blends of the present invention are well known int he art, and can be any suitable polycarbonate having a molecular weight preferably of from about 20,000 to about 40,000. Similarly, the linear polyamides which can be employed in the formulation of the blends of the present invention are also well known in the art and embrace those semi-crystalline and amorphous resins having a molecular weight of at least 2,000, commonly referred to as nylons. Desirably, the polyamide resins will have a molecular weight of at least about 5,000, and includes such polyamides as polycaprolactam (6 nylon), polyhexamethylene adipamide (66 nylon), polyhexamethylene azelamide (69 nylon) and the like.

In order for the polycarbonate constituent to be compatible with the polyamide constituent of the blend the polymeric compatibilizing agent must have at least one functional group soluble in the polycarbonate and at least one functional group soluble in the polyamide. The amount of the polymeric compatibilizing agent incorporated into the blend can vary widely, but will generally be in an amount of from about 2 to about 20 weight percent of the blend. Further, since it is desirable that the blend be melt compounded it is important that the melting or softening point of the polymeric compatibilizing agent preferably be no greater than the melting or softening point of the polycarbonate and polyamide constituents of the blend.

Any suitable compound satisfying the above-described criteria can be employed as the polymeric compatibilizing agent in the formulation of the polycarbonate-polyamide blends of the present invention. However, desirable results can be obtained when the polymeric compatibilizing agent comprises (a) from about 10 to 90, preferably between 15 and 75, and more preferably between 20 and 55 weight percent of a polyetherimide, a polyurethane or a linear segmented thermoplastic elastomer having an ester segment and a hard segment of semi-crystalline, partially aromatic polyamide, based on diphenylmethane diisocyanate (such as the elastomers marketed by Dow Chemical Company under the trademark "Estamide 90A"; (b) from about 90 to 10, preferably 75 to 20, and more preferably 60 to 40 weight percent of maleic anhydride grafted polymeric blend; and (c) from 0 to about 80, preferably 25 to 75, and more preferably 30 to 50 weight percent of an alloying agent. It is also possible to utilize the polyetherimide, polyurethane or linear segmented thermoplastic elastomer as the sole compatibilizing agent (i.e., in an amount of up to 100%). According to another embodiment of the invention, the polymeric compatibilizing agent comprises mixtures of from about 25 to about 50 weight percent of the polyetherimide, polyurethane, or linear segmented thermoplastic elastomer having an ester segment and a hard segment of semi-crystalline, partially aromatic polyamide, from about 25 to about 50 weight percent of the maleic anhydride grafted polymeric blend, and from 0 to about 50 weight percent of the alloying agent.

The blends of the invention include a polyetherimide of the formula:

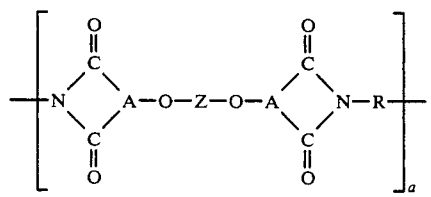

where a represents a whole number in excess of 1, e.g., 10 to 10,000 or more, the group —O—A< is selected from:

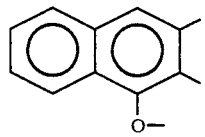

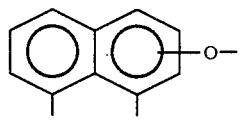

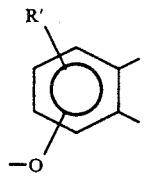

R' being hydrogen, lower alkyl or lower alkoxy, preferably the polyetherimide includes the latter —O—A< group where R' is hydrogen such that the polyetherimide is of the formula:

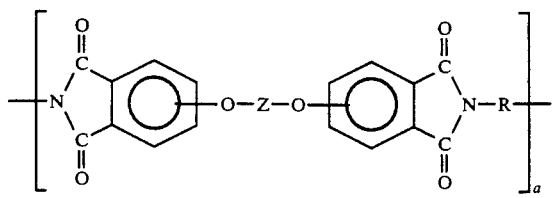

and the divalent bonds of the —O—Z—O radical are in the 3,3'; 3,4'; 4,3' or the 4,4' position; Z is a member of the class consisting of (1)

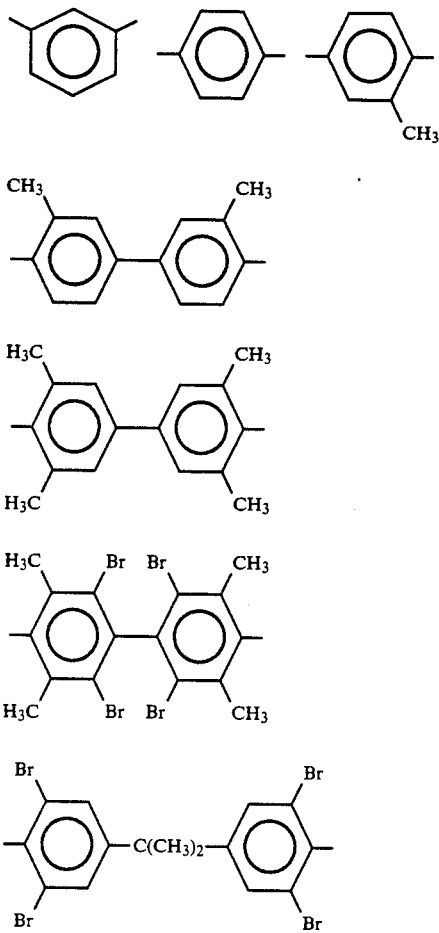

and (2) divalent organic radicals of the general formula:

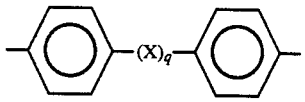

where x is a member selected from the class consisting of divalent radicals of the formulas:

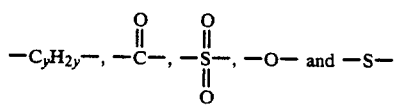

ps where q is 0 or 1, y is a whole number from 1 to 5; and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxanes, and (3) divalent radicals included by the formula:

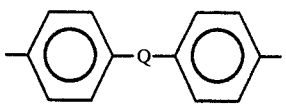

where Q is a member selected from the class consisting of

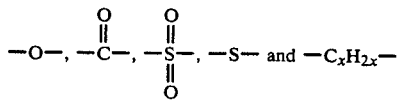

and x is a whole number from 1 to 5 inclusive. Particularly preferred polyetherimides for the purposes of the present invention include those where —O—A< and Z respectively are:

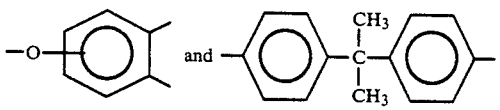

and R is selected from:

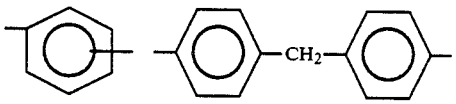

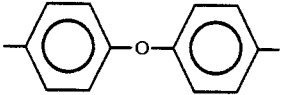

The polyetherimides where R is metaphenylene are most preferred.

The polyurethane which can be employed as the polymeric compatibilizing agent in the polycarbonate-polyamide blends of the present invention are characterized as polyester urethane elastomers or the reaction products of polyesters and diisocyanates having a melting point less than the processing range used for compounding the compositions of the invention, i.e. 480° F. to 550° F. Illustrative of polyurethane having the before-described characteristics, and which can be employed as the compatibilizing agent in the polymeric blends of the present invention are "PS 195-300", "PN-03-100" and "PS 440-100" polyurethanes manufactured by K. J. Quinn Company, and the like.

The maleic anhydride grafted polymeric blends which can be employed as the compatibilizing agent in the polycarbonate-polyamide blends of the present invention include blends of maleic anhydride grafted polypropylene or maleic anhydride grafted ethylene propylene, and these can be prepared by any suitable grafting techniques known in the art. Further the amount of the maleic anhydride grafted polypropylene and the maleic anhydride ethylene-propylene rubber present in the grafted polymeric blend constituent of the polymeric compatibilizing agent can vary widely. However, the maleic anhydride grafted polypropylene rubber will generally be present in the grafted polymeric blend in a weight ratio of from about 0:1 to about 5:2, preferably in a ratio of between 1:3 to 3:1, and most desirably in a weight ratio of about 3:2.

The alloying agent which may be utilized as one of the constituents of the polymeric compatibilizing agent in the polycarbonate-polyamide blends can be any suitable alloying agent which is compatible with the polycarbonate, the polyamide and the other constituents comprising the polymeric compatibilizing agent. Generally, the alloying agents which can be employed as a constituent of the polymeric compatibilizing agent are characterized as thermoplastic resins compatible with either the polyamide, the polycarbonate, or both, and which improves properties of the overall polymeric blends of the invention, such as cost, impact strength, and processability. Examples of such thermoplastic resins which can be employed as the alloying agent are acrylonitrile-butadiene-styrene terpolymers, styrene-maleic anhydride copolymers, polyester elastomers, methacrylate-butadiene-styrene terpolymers, polymethylmethacrylate, nitrile rubber, ionomers of polyethylene, polyether block amides, polyphenylene oxide polymers and the like, as well as mixtures thereof.

The polyetherimides can be obtained by any of the methods well known to those skilled in the art including the reaction of any aromatic bis(ether anhydrides) of the formula

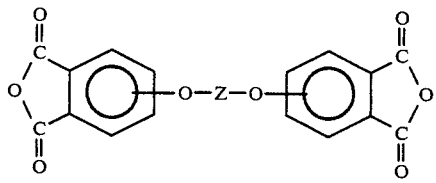

where Z is a defined hereinbefore with an organic diamine of the formula

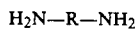

where R is as defined hereinbefore.

Aromatic bis(ether anhydride)s of the above formula include, for example, 2,2-(bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'bis(2,3-dicarboxyphenoxy)diphenyl sulfone dianhydride; etc., 2,2-bis [4-(3,4-dicarboxyphenoxy)phenyl]-propane dianhydride; 4,4'-bis(3,4-dicarboxyphenoxy)-diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy)diphenyl-2,2-propane dianhydride; etc.; and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. Patent No. 257,010, issued Nov. 11, 1969. Also, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4'-bis(beta-amino-t-butyl)toluene, bis(p-beta-amino-t-butylphenyl)ether, bis(p-beta-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2, 6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl)tetramethyl disiloxane, and the like, and mixtures of such diamines.

In general, the reactions can be advantageously carried out employeing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity greater than 0.2 deciliters per gram, preferably 0.35 to 0.6 or 0.7 deciliters per gram or even higher when measured in m-cresol at 25° C.

Included among the many methods of making the polyetherimides are those disclosed in U.S. Pat. Nos. 3,847,867, 3,847,869, 3,850,885, 3,852,242 and 3,855,178. These disclosures are incorporated herein in their entirety by reference for the purpose of teaching, by way of illustration, general and specific methods for preparing polyetherimides suitable for the blends of this invention.

A convenient method for preparing the polymeric blends of polycarbonates and polyamides of the present invention is to premix the constituents, (that is, the polycarbonate, the polyamide and the polymeric compatibilizing agent) in the proper weight proportions and in finely divided form to produce a substantially homogeneous dry mixture which is then introduced into a compounding extruder, heated to a molten mass and extruded. Desirably, the ingredients, in a powder or granule state, are blended in a low intensity mixer, such as a ribbon blender, for an effective period of time until a substantially uniform or homogeneous mixture is provided. While the amount of time required to produce the substantially homogeneous mixture can vary widely, desirable results have been obtained when the mixing of the dry ingredients in the ribbon blender is from about 2 to about 5 minutes, and more desirably from about 2 to about 3 minutes.

The dry-blended mixture is fed to a compounding extruder, which serves to heat the mixture to a substantial homogeneous plasticized mass, which plasticized mass is then extruded through the die head of the extruder into strands and is thereafter chopped into pellets.

A single screw or twin screw extruder or reciprocating mixer, such as Buss kneader, can be utilized as the compounding extruder. However, a twin screw extruder, such as a Werner Pfleider WP ZSK 83 or Werner Pfleider ZSK 90 twin screw extruder, is preferred because of the high shear obtained on the molten mass in the extruder. In addition, high screw speeds are desired, such as from about 100 to about 300 rpm, to insure that the molten mass is subjected to high shear and to further insure substantially uniform mixing of the constituents of the molten mass.

The compounding extruder is operated at a temperature and pressure sufficient to melt the constituents forming the blend and produce a molten mass which can be extruded. Generally, the compounding extruder is operated at a temperature of from about 480° F. to about 550° F. and at a pressure of from about 500 psi to about 1500 psi, and more desirably at a temperature of about 500° F. and at a pressure of about 1000 psi.

The molten homogeneous mass is advanced through the compounding extruder to the die head where the plasticized homogeneous mass is extruded through a plurality of orifices in the die head into an atmospheric environment as strands. The die head of the compounding extruder is maintained at the same temperature that the molten mass is heated to in the compounding extruder, such as a temperature of from about 480° F. to about 550° F.

As previously stated, the extrudate comprises a plurality of strands. The strands are thereafter chopped into pellets. The pelletizing of the extrudate can be accomplished by a strand cut pelletizer, such as a Cumberland pelletizer (where cooling is accomplished in a water bath prior to feeding the strands through the pelletizer), or by an underwater pelletizer, such as a Gala Unit (where the pellets are cut at the die face). The pelletized polymeric blend of a polycarbonate and a polyamide can thereafter be utilized as feedstock in the fabrication of desired articles through either a molding or extrusion process. Such molding and extrusion processes are well known in the art.

The melt compounded blend of the polycarbonate, the polyamide and the compatibilizing agent prepared in accordance with the procedure set forth above has been found to possess the desired properties of each of the constituents, while substantially eliminating the undesirability properties of such constituents.

In order to more fully describe the present invention, the following examples are set forth. However, it is to be understood that the examples are for illustrative purposes only and are not to be construed as limiting the scope of the present invention as defined in the appended claims.

EXAMPLES

A series of experiments were conducted on articles molded of polymeric materials to determine the chemical and physical properties of the polymeric materials. The polymeric resins used in the fabrication of the articles tested were in a powder of granular state, and were dry blended in a ribbon blender for approximately 3 minutes to insure that the constituents were thoroughly mixed and that a substantially uniform or homogeneous mixture was obtained.

The dry blended mixture was then fed to a twin screw compounding extruder (i.e. a Warner Pfleider WP ZSK 83 extruder) which was operated at approximately 1000 psi and had a production rate of 200 lbs/hr. and a residence time in the extruder of approximately 3 minutes. The screw speed, which was independently controlled relative to the output rate of the extruder, was 150 RPM to insure that a high shear was produced on the molten polymeric mass in the extruder and to further insure that the molten polymeric mass was a substantially homogeneous mass. The molten polymer mass or blend was extruded through the die head of the compounding extruder in the form of strands. The strands were passed through a water bath to cool the strands, and thereafter the strands were cut into pellets with a Cumberland pelletizer.

A typical temperature profile of the compounding extruder, which progressively increases from intake to the die head so as to insure proper melting and mixing of the polymeric constituents and form a substantially homogeneous blend thereof, is as follows:

| Feed | Transition | Metering | Die Head |
|---|---|---|---|
| 460° F. | 480° F. | 480° F. | 480° F. |

The pellets obtained from each of the experiments were then molded into articles so that the chemical and physical properties of the polymeric materials, and thus the articles fabricated therefrom, could be determined. Table I sets forth the composition of each of the polymeric materials; and Table II is a compilation of test data relating to physical properties of each of such polymeric materials.

TABLE I

| Composition of Polymeric Materials (weight percent) | | | | | | |
|---|---|---|---|---|---|---|
| Polymeric Constituent | Control | 1. | 2. | 3. | 4. | 5. |
| Polyamide (polycaprolactam, i.e. nylon 6) | 20 | 45 | 30 | 30 | 30 | 15 |
| Polycarbonate (Ave M.W. of approximately 30,000) | 80 | 40 | 55 | 60 | 60 | 75 |
| Compatibilizing agent* | — | 5 | 5 | 0 | 5 | 5 |
| Compatibilizing agent (Maleic anhydride grafted polymeric blend containing 3 parts by weight maleic anhydride grafted polypropylene and 2 parts by weight maleic anhydride grafted ethylene-propylene rubber | | 10 | 10 | 10 | 5 | 5 |

*linear segmented thermoplastic elastomer having an ester segment and a hard segment of semi-crystalline, partially aromatic polyamide, based on diphenylmethane diisocyanate and marketed by Dow Chemical Company under the trademark "Estamide 90A".

TABLE II

Physical Property Data

| Physical Property | Polymer Identification | | | | | |
|---|---|---|---|---|---|---|
| | Control* | No. 1 | No. 2 | No. 3 | No. 4 | No. 5 |
| Flex Modulus (psi) | — | 330,000 | 300,000 | 330,000 | 360,000 | 340,000 |
| Tensile Strength (psi) | — | 9,500 | 8,800 | 9,500 | 9,000 | 8,400 |
| Notched Izod | — | 15 | 22 | 8.2 | 18 | 19 |
| Gardner Impact | >>320 | >>320 | 124 | >>320 | >>320 | — |

*Physical properties could not be determined because the resins are incompatible.

A second series of tests were conducted to compare the physical and chemical properties of a polycarbonate polymer, a polyamide polymer (nylon 6) and polymeric blends of such polymers containing compatibilizing agents formulated in accordance with the present invention. Table III sets forth the composition of the polymers; and Table IV is a compilation of the tetst data obtained on such polymer.

TABLE III

Composition of Polymeric Materials (weight percent)

| Polymeric Constituents | Control #1 | Control #2 | Polymeric Blend No. 6 | Polymeric Blend No. 7 |
|---|---|---|---|---|
| Polycarbonate (Ave. M.W. of approximately 30,000) | 100 | — | 65 | 40 |
| Polyamide (polycaprolactam, i.e. nylon 6) | — | 100 | 15 | 45 |
| Compatibilizing agent* | — | — | 5 | 5 |
| Compatibilizing agent (maleic anhydride grafted polymeric blend containing 3 parts by weight maleic anhydride grafted polypropylene and 2 parts by weight maleic anhydride grafted ethylene-propylene rubber | — | — | 5 | 10 |
| Compatibilizing agent (acrylonitrile-butadiene-styrene toughening agent) | — | — | 10 | — |

*linear segmented thermoplastic elastomer having an ester segment and a hard segment of semi-crystalline, partially aromatic polyamide, based on diphenylmethane diisocyanate and marketed by Dow Chemical Company under the trademark "Estamide 90A".

TABLE IV

Physical and Chemical Property Data

| Properties Tested | Polymer Identification | | | |
|---|---|---|---|---|
| | Control #1 | Control #2 | Polymeric Blend No. 6 | Polymeric Blend No. 7 |
| Flex Modulus (psi) | 350,000 | 400,000 | 360,000 | 340,000 |
| Tensile Strength (psi) | 9,500 | 11,900 | 9,750 | 10,000 |
| Heat Distortion Temperature (°F.) | 260 | 136 | 250 | 200 |
| Notched Izod | 12 | 1.4 | 25 | 19.4 |
| 24 Hour Water Absorption | 0.3 | 2.5 | 0.4 | 0.5 |
| Chemical Resistance: | | | | |
| Detergent* | Poor | Excellent | Excellent | Excellent |
| Alcohol (10% isopropanol) | Poor | Excellent | Excellent | Excellent |
| Turpentine | Poor | Excellent | Good | Excellent |
| Stress Crack Resistance: | | | | |
| Detergent* | 24 hr. | >720 hr. | 720 hr. | 720 hr. |
| Alcohol (10% isopropanol) | 24 hr. | >720 hr. | 720 hr. | 720 hr. |
| Petroleum Distillates** | 50 hr. | >720 hr. | 720 hr. | 720 hr. |
| Paint Thinner | 24 hr. | >720 hr. | 720 hr. | 720 hr. |
| Toluene | 15 hr. | >720 hr. | 87 hr. | 720 hr. |

*Detergent - "Rapid Dri" manufactured by Sanolite Chemical Company.
**"WD-40" marketed by the WD-40 Company.

A third series of tests were conducted to illustrate the properties of a polymeric blend of a polycarbonate polymer, a polyamide polymer, and a compatabilizing agent of 33.3 weight percent Estamid 90A, and 66.7 weight percent of maleic anhydrids grafted ethylene-propylene rubber. The proportions of the components are set forth in Table V, with the properties listed in Table VI.

TABLE V

| Polymeric Constituents | Polymeric Blend No. 8 |
| --- | --- |
| Polycarbonate | 45 |
| Polyamide | 40 |
| Compatibilizing agent - Estamid 90A | 5 |
| Compatibilizing agent - EP rubber | 10 |

TABLE VI

| Properties Tested | Polymeric Blend No. 8 |
| --- | --- |
| Flex Modulus (psi) | 330,000 |
| Tensile Strength (psi) | 9,000 |
| HDT (°F.) | 205 |
| Notched Izod | 17.2 |
| 24 hr. $H_2O$ | 0.5 |
| Chemical Resistance: | |
| Detergent | Excellent |
| Alcohol | Excellent |
| Turpentine | Excellent |
| Stress Crack Resistance: | |
| Detergent | >720 hr. |
| Alcohol | >720 hr. |
| Petroleum Distillates | >720 hr. |
| Paint Thinner | >720 hr. |
| Toluene | >720 hr. |

The above data clearly indicates the improved physical and chemical properties imparted to the polymeric blends of the present invention, and thus to articles fabricated from such polymeric blends. Further, the unique combination of the polycarbonate, the polyamide and the compatibilizing agent in the formulation of the unique polymeric blends of the present invention provides an unexpected synergistic effect on the chemical and physical properties of the polymeric blends.

Finally, in the compositions of the invention, it is also possible to add other impact modifying agents along with or instead of the previously described maleic anhydride grafted polymers. Suitable impact modifying agents include those disclosed in U.S. Pat. No. 4,174,358, the content of which is expressly incorporated herein by reference thereto. These agents may be generally described as at least one polymer taken from the class consisting of branched and straight chain polymers having a tensile modulus in the range of 1 to 20,000 psi.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A polymeric compatibilizing agent for blends of polycarbonate and polyamide resins, which comprises:
   from about 10 to about 90 weight percent of a linear segmented thermoplastic elastomer having an ester segment and a hard segment of a semi-crystalline, partially aromatic polyamide based on diphenyl methane diisocyanate;
   from about 90 to about 10 weight percent of an impact modifying agent comprising a maleic anhydride grafted polymer or polymeric blend to improve the low temperature impact resistance of the resin blend; and
   from 0 to about 80 percent of an alloying agent of a thermoplastic resin;
   wherein the melting or softening point of said compatibilizing agent is no greater than the melting or softening points of the resin constituents of the blend.

2. The agent of claim 1 wherein the impact modifying agent is a maleic anhydride grafted polypropylene and maleic anhydride grafted ethylene-propylene rubber in a weight ratio of from about 0:1 to about 5:2.

3. The agent of claim 1 wherein the alloying agent is an acrylonitrile-butadiene-styrene terpolymer, a styrene-maleic anhydride copolymer, a polyester elastomer, a methacrylate-butadiene-styrene terpolymer, polymethylmethacrylate, nitrile rubber, an ionomer of polyethylene, a polyether block amide, a polyphenylene oxide polymer or mixtures thereof.

4. The agent of claim 1 wherein said impact modifying agent is present in an amount of from about 25 to about 50 weight percent, and is an maleic anhydride grafted polymeric blend comprising between about 50 to 75 parts by weight of maleic anhydride grafted polypropylene and about 50 to 25 parts by weight of maleic anhydride grafted ethylene-propylene rubber.

5. The agent of claim 4 wherein the maleic anhydride grafted polypropylene and maleic anhydride grafted ethylene propylene are present in a weight ratio of about 3:2.

6. The agent of claim 1 wherein the linear segmented thermoplastic elastomer is present in an amount of between about 15 and 75 weight percent, the impact modifying agent is a maleic anhydride grafted polymeric blend and is present in an amount of between about 75 and 20 weight percent, and the alloying agent is present in an amount of between about 25 and 75 weight percent.

7. The agent of claim 1 wherein the linear segmented thermoplastic elastomer is present in an amount of between about 20 and 55 weight percent, the impact modifying agent is a maleic anhydride grafted polymeric blend and is present in an amount of between about 60 and 40 weight percent, and the alloying agent is present in an amount of between about 30 and 50 weight percent.

8. The agent of claim 1 wherein the linear segmented thermoplastic elastomer is present in an amount of between about 25 and 50 weight percent, the impact modifying agent is a maleic anhydride grafted polymeric blend and is present in an amount of between about 50 and 25 weight percent, and the alloying agent is present in an amount of between about 0 and 50 weight percent.

9. A polymeric compatibilizing agent for a blend of two different polymer resins consisting essentially of:
   from about 10 to about 90 weight percent of a compatibilizing compound of a polyetherimide, polyurethane or a linear, segmented thermoplastic elastomer having an ester segment;
   from about 90 to about 10 weight percent of an impact modifying agent of a maleic anhydride grafted polymeric blend comprising a mixture of a maleic anhydride grafted polypropylene and maleic anhydride grafted ethylene-propylene rubber in a weight ratio of less than about 5:2 to improve the low temperature impact resistance of the resin blend; and from 0 to about 80 weight percent of an alloying agent of a thermoplastic resin;

wherein the melting or softening point of said compatibilizing agent is no greater than the melting or softening points of the first and second resin constituents of the blend.

10. The agent of claim 9 wherein the alloying agent is an acrylonitrile-butadiene-styrene terpolymer, a styrene-maleic anhydride copolymer, a polyester elastomer, a methacrylate-butadiene-styrene terpolymer, polymethylmethacrylate, nitrile rubber, an ionomer of polyethylene, a polyether block amide, a polyphenylene oxide polymer or mixtures thereof.

11. The agent of claim 9 wherein said impact modifying agent is present in an amount of from about 25 to about 50 weight percent and wherein the compatibilizing compound is present in an amount of between about 50 and 25 weight percent.

12. The agent of claim 11 wherein the weight ratio of maleic anhydride grafted propylene to maleic anhydride grafted ethylene propylene rubber is about 3:2.

13. The agent of claim 9 wherein the compatibilizing compound is present in an amount of between about 15 and 75 weight percent, the impact modifying agent is present in an amount of between about 75 and 20 weight percent, and the alloying agent is present in an amount of between about 25 and 75 weight percent.

14. A polymeric compatibilizing agent for blends of a polycarbonate resin and a second, different polymer resin comprising:

from about 10 to about 90 weight percent of a compatibilizing compound of a linear segmented thermoplastic elastomer having an ester segment and a hard segment of a semi-crystalline, partially aromatic polyamide, based on diphenyl methane diisocyanate;

from about 90 to about 10 weight percent of an impact modifying agent comprising at least one polymer which is compatible with one of said polycarbonate resin and said second polymer resin to improve the low temperature impact resistance of the resin blend; and an alloying agent of a thermoplastic resin in an amount sufficient to improve one or more other properties of the resin blend but less than about 80 weight percent, said alloying agent comprising an acrylonitrile-butadiene-styrene terpolymer, a styrene-maleic anhydride copolymer, a polyester elastomer, a methacrylate-butadiene-styrene terpolymer, polymethylmethacrylate, nitrile rubber, an ionomer of polyethylene, a polyether block amide, a polyphenylene oxide polymer or mixtures thereof;

wherein the melting or softening point of said compatibilizing agent is no greater than the melting or softening points of the polycarbonate and other polymer and resin constituents of the blend.

15. The agent of claim 14 wherein the impact modifying agent is a maleic anhydride grafted polymeric resin blend.

16. The agent of claim 14 wherein the impact modifying agent is at least one polymer taken from the class consisting of branched and straight chain polymers having a tensile modulus in the range of 1 to 20,000 psi.

17. The agent of claim 14 wherein the compatibilizing compound is present in an amount of between about 15 and 75 weight percent, the impact modifying agent is present in an amount of between about 75 and 20 weight percent, and the alloying agent is present in an amount of between about 25 and 75 weight percent.

18. The agent of claim 14 wherein the compatibilizing compound is present in an amount of between about 50 and 25 weight percent, the impact modifying agent is present in an amount of between about 50 and 25 weight percent, and the alloying agent is present in an amount of 50 weight percent or less.

19. A polymeric compatibilizing agent for a composition of two different polymer resins, which comprises:

from about 10 to about 90 weight percent of a compatibilizing compound of a polyetherimide, a polyurethane or a linear segmented thermoplastic elastomer having an ester segment;

from about 90 to about 10 weight percent of an impact modifying agent comprising a mixture of maleic anhydride grafted polypropylene and maleic anhydride grafted ethylene-propylene rubber in a weight ratio of less than about 5:2 to improve the low temperature properties of the composition; and from 0 to about 80 weight percent of an alloying agent of a thermoplastic resin;

wherein the melting or softening point of the compatibilizing compound is no greater than the melting or softening points of the first and second resins of the composition.

20. The agent of claim 19 wherein the maleic anhydride grafted polypropylene and maleic anhydride grafted ethylene propylene are present in a weight ratio of about 3:2, and in an amount of between about 25 and 75 weight percent.

21. The agent of claim 19 wherein the compatibilizing compound is present in an amount of between about 50 and 25 weight percent, the impact modifying agent is present in an amount of between about 50 and 25 weight percent and the alloying agent is present in an amount of 50 weight percent or less.

22. The agent of claim 19 wherein the compatibilizing compound is present in an amount of between about 15 and 75 weight percent, the impact modifying agent is present in an amount between about 75 and 20 weight percent, and the alloying agent is present in an amount of between 25 and 75 weight percent.

23. The agent of claim 22 wherein the alloying agent is an acrylonitrile-butadiene-styrene terpolymer, a styrene-maleic anhydride copolymer, a polyester elastomer, a methacrylate-butadiene-styrene terpolymer, polymethylmethacrylate, nitrile rubber, an ionomer of polyethylene, a polyether block amide, a polyphenylene oxide polymer or mixtures thereof.

* * * * *